United States Patent
Ma et al.

(10) Patent No.: US 9,208,322 B1
(45) Date of Patent: Dec. 8, 2015

(54) PRIVACY LEAK DETECTION IN .NET FRAMEWORK

(71) Applicants: Kun Ma, Nanjing (CN); Liang Sun, Nanjing (CN); Xiaoqiang Tong, Nanjing (CN)

(72) Inventors: Kun Ma, Nanjing (CN); Liang Sun, Nanjing (CN); Xiaoqiang Tong, Nanjing (CN)

(73) Assignee: Trend Micro Inc., Tokyo (JP)

( * ) Notice: Subject to any disclaimer, the term of this patent is extended or adjusted under 35 U.S.C. 154(b) by 24 days.

(21) Appl. No.: 14/028,474

(22) Filed: Sep. 16, 2013

(51) Int. Cl.
*G06F 13/00* (2006.01)
*G06F 21/57* (2013.01)

(52) U.S. Cl.
CPC .................... *G06F 21/577* (2013.01)

(58) Field of Classification Search
CPC ......... G06F 21/577; G06F 17/30; G06F 8/52; H04L 63/1433; H04L 63/1416; H04L 63/20; H04L 63/1408
See application file for complete search history.

(56) References Cited

U.S. PATENT DOCUMENTS

2006/0253508 A1* 11/2006 Colton et al. .................. 707/206
2010/0115585 A1* 5/2010 Cohen .............................. 726/3

OTHER PUBLICATIONS

Manuel Egele_† , Christopher Kruegel†, Engin Kirda‡ §, and Giovanni Vigna† "PiOS: Detecting Privacy Leaks in iOS Applications" pp. 1-15.*

* cited by examiner

*Primary Examiner* — Carl Colin
*Assistant Examiner* — Ghodrat Jamshidi
(74) *Attorney, Agent, or Firm* — Beyer Law Group LLP

(57) ABSTRACT

A binary application suitable for the .Net framework is disassembled into human readable code. Or, CIL or MSIL code is obtained. The methods are put into a representation indicating which methods of the code call other methods. A source method call chain having a source API and a sink method call chain having a sink API are discerned from the representation. APIs are put into the same format as the methods to allow matching. A method in common between the two call chains indicates that a privacy leak exists. The application is downloaded from a remote server to a computing device where the analysis occurs.

16 Claims, 9 Drawing Sheets

```
                    PhoneAppTester-PhoneAppTester.MainPage-AccessWebAsync  ~~ 412

Position is 1580  ┐  ~414
Size is 50        ┘                                                        410

IL_0000       |  ldstr    |  4
IL_0005       |  call     |  (0A)000045   |  (RID:MemberRef, index:69)
```

```
(Class:System.Net-System.Net.WebRequest)  (Name:Create) (Sig:00011281310E) 4
                                      422                                  420
IL_000A       |  isinst   |  4
IL_000F       |  stloc.0  |
IL_0010       |  newobj   |  (06)00001C   |  (RID:Method, index:28)
```

```
(Name: PhoneAppTester-PhoneAppTester.RequestState-.ctor)      4
IL_0015       |  stloc.1  |                              432
IL_0016       |  ldloc.1  |
IL_0017       |  ldloc.0  |                                                430
IL_0018       |  stfld    |  4
IL_001D       |  ldloc.0  |
IL_001E       |  ldnull   |
IL_001F       |  ldftn    |  (06)000016   |  (RID:Method, index:22)
```

```
(Name:PhoneAppTester-PhoneAppTester.MainPage-RespCallback)  4     440
                                                             442

IL_0025       |  newobj   |  (0A)000046   |  (RID:MemberRef, index:70)
```

```
(Class:mscorlib-System.ASyncCallback)  452   (Name:.ctor) (Sig:2002011C18)   4
                                                                             450
IL_002A       |  ldloc.1  |
IL_002B       |  callvirt |  (0A)000047   |  (RID:MemberRef, index:71)
```

```
(Class:System.Net-System.Net.WebRequest)  462
                                                                 460
(Name:BeginGetResponse) (Sig:200212391281351C)   4
IL_0030       |  pop      |
IL_0031       |  ret      |
```

470        480           490

Disassembled Code

FIG. 4

Example Method Call Graph

Source API Method Call Chain

Microsoft.Phone-Microsoft.Phone.UserData.Contacts-SearchAsync<--
PhoneappTester-.<SearchContacts_Click>d__0-MoveNext

— 710

System.Net-System.Net.WebRequest-BeginGetResponse <--
PhoneAppTester-PhoneAppTester.MainPage-AccessWebAsync <--
PhoneAppTester-.<SearchContacts_Click>d__0-MoveNext

— 720

Sink API Method Call Chain

*FIG. 7*

Intersection of Two Method Call Chains

PRIVACY LEAK DETECTION IN .NET FRAMEWORK

FIELD OF THE INVENTION

The present invention relates generally to detection of a privacy leak from a software application on mobile device. More specifically, the present invention relates to privacy leak detection of applications used within the .NET framework on Microsoft's Windows Phone or other mobile device using Microsoft's windows operation-system.

BACKGROUND OF THE INVENTION

Malicious software (or malware) may affect a mobile device in many different ways. One current technique that is used is to gather sensitive or private information from a user's mobile device and then send that information over a communications link to an outside entity. Thus, the user's sensitive or private information (which he or she thinks is safe upon his or her private mobile device) is sent to an entity that may misuse that information. Examples of information that may be sent include: the user's geographic location, passwords and user names, financial information, credit card information, contact information of others, etc.

The gathering of this sensitive or private information is not necessarily limited to malicious software created by unscrupulous persons. With the growing popularity of mobile devices and the thousands upon thousands of mobile applications available for download over the Internet, it is possible that (and instances have occurred in which) well-meaning writers of these applications have programmed these applications to gather sensitive or private information and send it to a remote location. In addition, there have been instances in which well-known corporations have distributed software applications that collect user information from a computing device and send that information to a remote location.

Against this backdrop of potential privacy leakage, the .NET framework is becoming a very important infrastructure used with new software applications. As is known in the art, this software framework (developed by Microsoft Corporation) runs primarily on Microsoft operating systems but can run on other platforms as well. Software applications that are written for this .NET framework execute within a software environment known as the Common Language Runtime (CLR), which is an application virtual machine. The .NET framework includes a class library and the CLR. Typically, programmers produce a software application by combining their own source code with the .NET framework in other libraries.

As this framework is becoming more popular, and as more and more software applications are being written (especially by third parties and for mobile devices), it is desirable to have techniques that will detect leakage of sensitive and private information from within this framework.

SUMMARY OF THE INVENTION

To achieve the foregoing, and in accordance with the purpose of the present invention, a technique is disclosed that detects privacy leaks of software applications used within the .Net framework.

In a first embodiment, a binary application suitable for execution within the framework is obtained and this binary application is disassembled into human readable code. The code may be CIL code or MSIL code. The methods of the code are put into a representation indicating which methods of the code call other methods of the code. This representation may be a method call graph. From the graph, two types of method call chains may be discerned: a source method call chain having a source API, and a sink method call chain having a sink API. If there is a method in common between these two call chains then an alert is generated indicating that a privacy leak exists in the application.

In a second embodiment, a binary application suitable for execution within the framework is obtained and this binary application is disassembled into human readable code. The methods of the code are put into a representation indicating which methods of the call other methods of the code. This representation may be a method call graph. From the graph, two types of method call chains may be discerned: a source method call chain having a source API, and a sink method call chain having a sink API. If there is no method in common between these two call chains then a message is generated indicating that no privacy leak exists in the application.

In a third embodiment, a software application suitable for execution within the framework is obtained; the software application is in CIL code. The methods are formatted in a standard format and the methods of the code are put into a data structure indicating which methods of the call other methods of the code. Potential application programming interfaces (APIs) that might be called by the methods are also formatted in the same standard format. A source method call chain is discerned from the data structure that has a method matching one of the APIs, and a sink method call chain is also discerned that has a method matching another one of the APIs. If the call chains have a method in common then a privacy leak alert is generated.

BRIEF DESCRIPTION OF THE DRAWINGS

The invention, together with further advantages thereof, may best be understood by reference to the following description taken in conjunction with the accompanying drawings in which:

FIG. 4 illustrates one embodiment in which the code has been disassembled into an MSIL representation.

FIG. 7 illustrates examples of a source API method call chain and a sink API method call chain that have been determined from the method call graph.

DETAILED DESCRIPTION OF THE INVENTION

Figure 1:
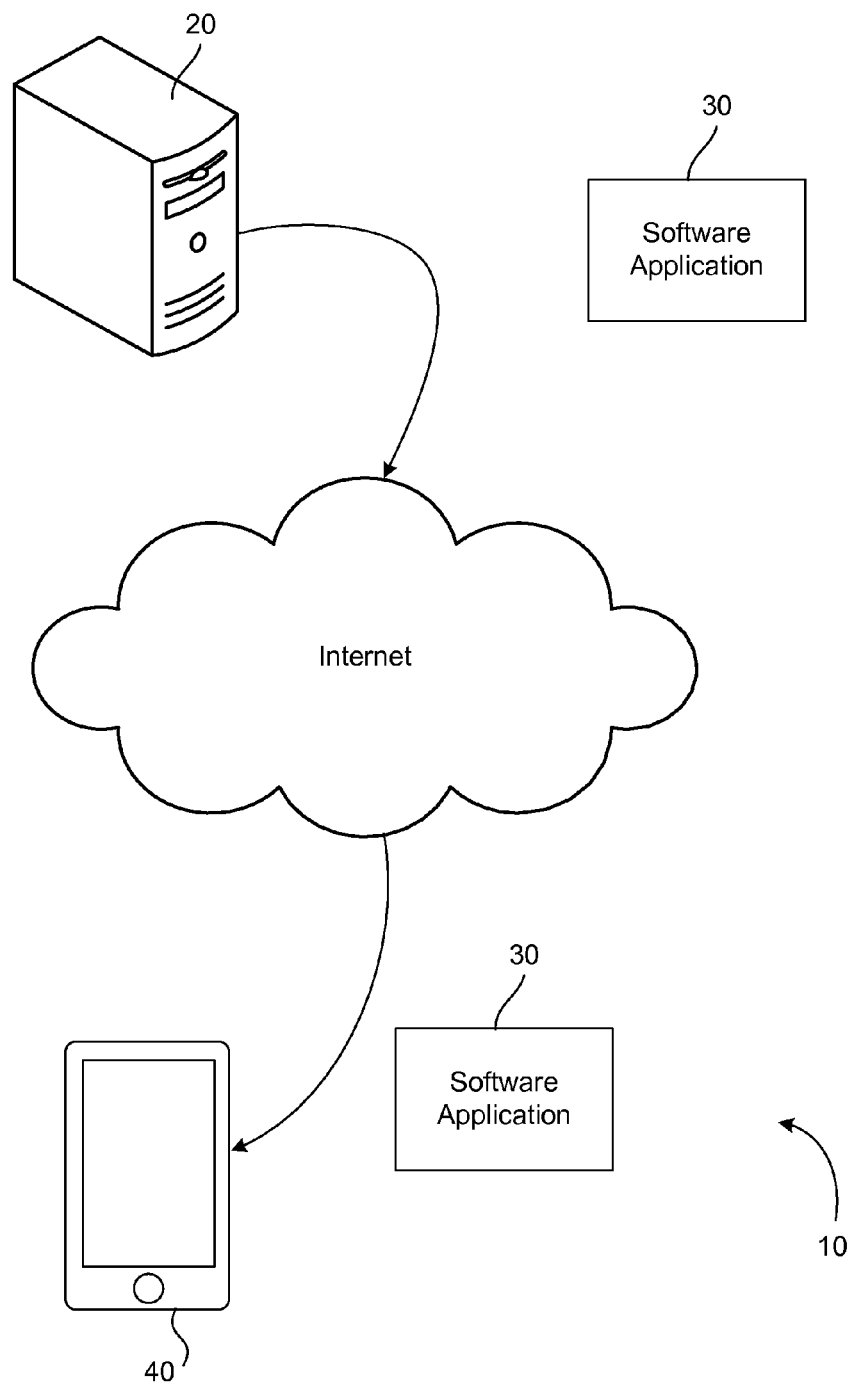
FIG. 1 illustrates an environment in which a software application is downloaded to a computing device.

FIG. 1 illustrates an environment 10 in which a software application is downloaded to a computing device. In this example, a computer server 20 (or servers) is located remotely and is accessible over an Internet connection. The server stores and makes available any number of software applications designed for use with computing devices that run, for example, an Apple operating system, a Microsoft operating system, an Android operating system, or other operating systems. The Web site implemented upon the server may be known as the Apple Store, the iTunes Store, the Windows Store, the Windows Phone Marketplace, the Android Market, Google Play, or any of a number of other Web sites that provide software applications.

Software application 30 is any software application written for use within the .NET framework. As is known in the art, this framework is engineered to be platform agnostic and cross-platform implementations are available for operating systems other than Microsoft operating systems. The framework is available for use upon not only desktop computers, but also upon other computing devices such as mobile telephones and tablet computers. For example, two versions of the framework are available for mobile or embedded device use, and a reduced version of the framework, the .NET compact framework, is available on mobile devices. The .NET Micro Framework is intended for resource constrained devices. The software environment "Mono" is an implementation of the CLI and the .NET Base Class Library. The software environment Portable.NET also provides an implementation of the CLI. CrossNet is another implementation of the CLI. The term ".NET framework" or "framework" is meant to encompass all of these above-described frameworks, software and environments.

The Common Language Runtime (CLR) is the execution engine of the .NET framework, and the Common Language Infrastructure (CLI) defines a specification for programming languages. Within this architecture, the Common Intermediate Language (CIL) is the lowest-level human-readable programming language defined by the CLI specification which is executed within the CLR. Programs written for use within the framework are translated into the CIL which may then be assembled into object code for execution. Formerly, the CIL was known as the Microsoft Intermediate Language (MSIL).

Software applications distributed by server 20 are typically distributed as binary code and are executed by the CLR on the target computing device. For example, an application can be distributed as a compressed package which includes the executable binary code, the application's signature, resources, manifest file, and so on. In other situations, it is also possible for software application 30 to be distributed as a higher-level language or as CIL code. Once software application 30 has been downloaded to computing device 40 it is ready for execution (or further compilation). Computing device 40 may be any suitable computing device such as a desktop computer, mobile telephone, tablet computer or other.

Figure 2:
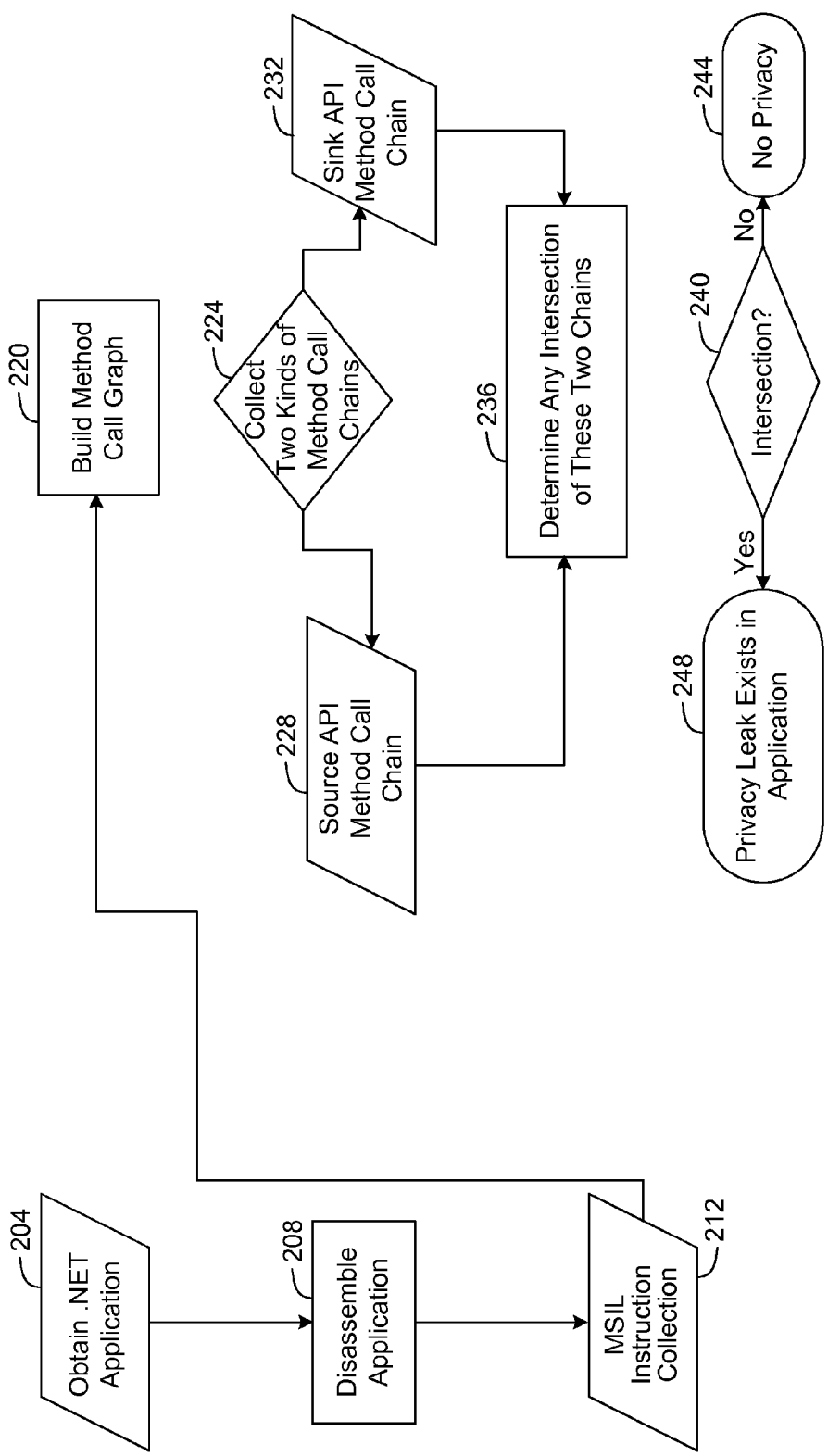
FIG. 2 is a flow diagram describing one embodiment in which a privacy leak in an application is detected.

FIG. 2 is a flow diagram describing one embodiment in which a privacy leak in an application is detected. In step 204 a .Net application is obtained for analysis. In one embodiment, this is a software application 30 that has been downloaded to a computing device 40, and the application is available on the computing device. In other embodiments, this application is obtained over the Internet for analysis. As mentioned earlier, the invention applies to software applications written for the .Net Framework, especially those applications destined to be executed on a Microsoft operating system. The application will typically be in binary code. The following provides a description of the origin of this binary code and how it is then treated.

Figure 3:
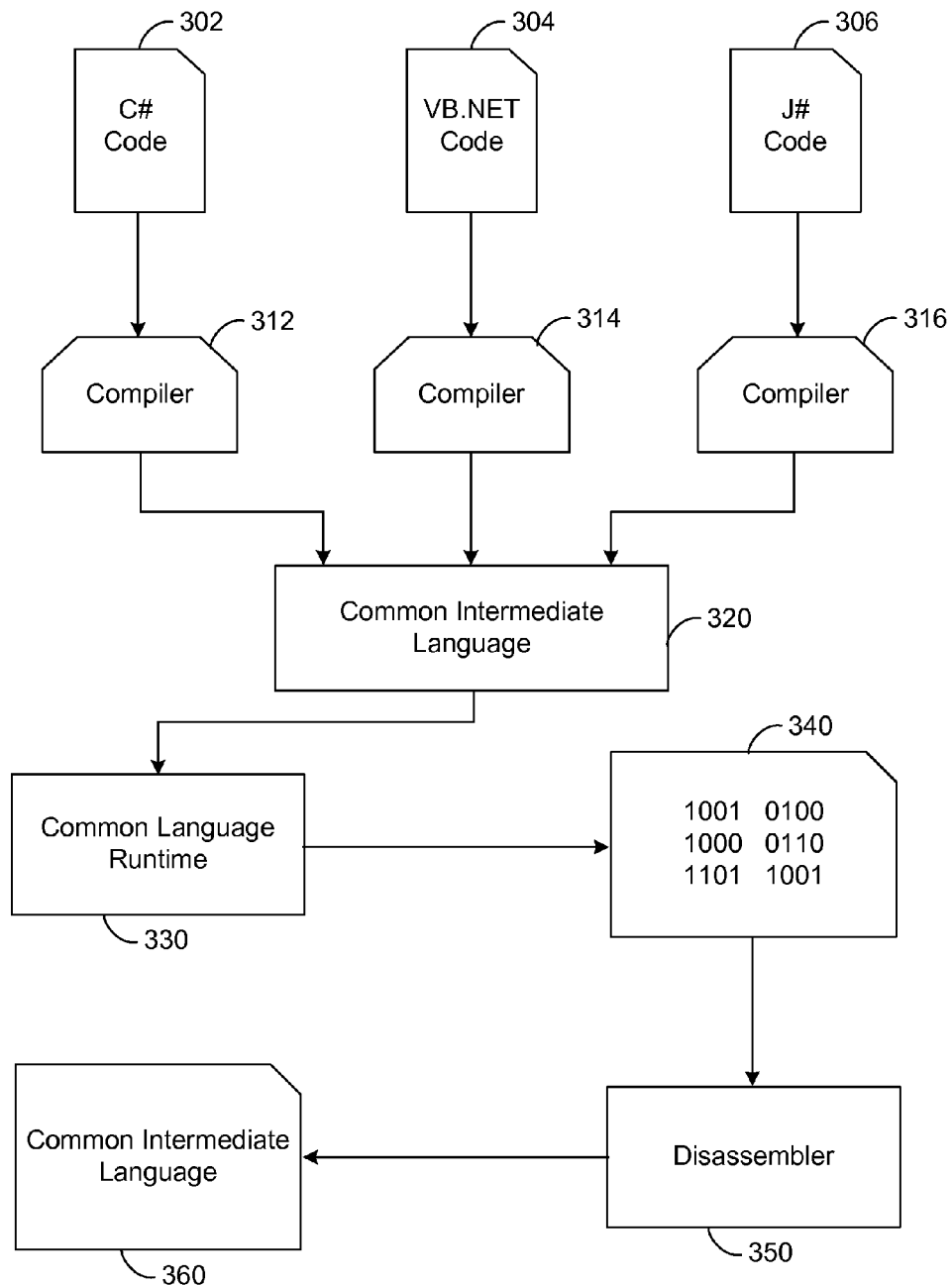
FIG. 3 is a block diagram that illustrates the Common Language Infrastructure (CLI) and a portion of the present invention.

FIG. 3 is a block diagram that illustrates the Common Language Infrastructure (CLI) and a portion of the present invention. As shown in the figure, compatible high-level languages 302-306 are compiled using a suitable compiler 312-316 into a platform-neutral language called the Common Intermediate Language 320. The Common Language Runtime 330 is then able to compile the CIL code 320 into machine-readable (binary) code 340 that can be executed on a particular computing platform.

Advantageously, the present invention realizes that this binary code 340 may then be converted back into CIL code 360 using a disassembler 350 and that the CIL code may then be further analyzed to detect privacy leaks. Accordingly, in step 208 a disassembler is used to disassemble application 30 into a CIL representation (or into an MSIL representation). Any suitable disassembler may be used, including off-the-shelf software or custom code. Off-the-shelf software includes an open source project named "Mono" (available at http://www.mono-project.com/Main_Page) and a Microsoft dissembler named "ildasm.exe" which is included in the Visual Studio SDK. In one embodiment, a custom disassembler written in the Java language and using Apache and Java libraries may be used, and makes use of the Common Language Infrastructure Standard ECMA-335 (sixth edition, June 2012). This disassembler advantageously only needs to disassemble the code needed in the below steps.

In one particular embodiment, it is not necessary to disassemble the binary application into a complete CIL representation. Only instructions need be represented, and in particular, only the method calls need be expanded from binary code into a CIL representation. Next, in step 212 all of the relevant instructions that have been disassembled into CIL are collected.

FIG. 4 illustrates one embodiment in which the code has been disassembled into an MSIL representation. Of course, once the code has been disassembled into a representation such as into CIL or into MSIL, it may be formatted in a variety of ways. The formatting will depend upon the particular implementation, programming style, etc. In one embodiment, methods and classes are organized as shown in FIG. 4. In this embodiment, method names are formatted in a particular way using the format "ScopeName-Type NameSpace.Type Name-Method Name." Thus, numeral 412 provides the overall method name in which the method name is "AccessWebAsync," its type is "MainPage," it's types namespace is "PhoneAppTester," and its scope is "PhoneAppTester."

Information 414 provides additional details concerning the overall method such as the method offset in binary and its size. Each method (or class) is shown along with its instructions in regions 420-460. Within each region, the instructions are organized as follows. Column 470 provides the label for each instruction's offset for a particular method (such as offset "IL_000A" for method 420), column 480 shows the actual operation code ("Op Code") for each instruction, and column 490 provides the various operands for each instruction.

In this example, the overall method 412 includes two instructions, the method 432 includes seven instructions, and the method 442 includes one instruction. Class names 422, 452 and 462 include respectively three, two and two instructions. In this fashion, the classes and methods of a particular application can be collected, organized, and made ready for future analysis. Next, in step 220 a method call graph may be built using the methods, classes and instruction information shown, for example, in FIG. 4. Any of a variety of techniques may be used to build the method call graph.

Figure 5:
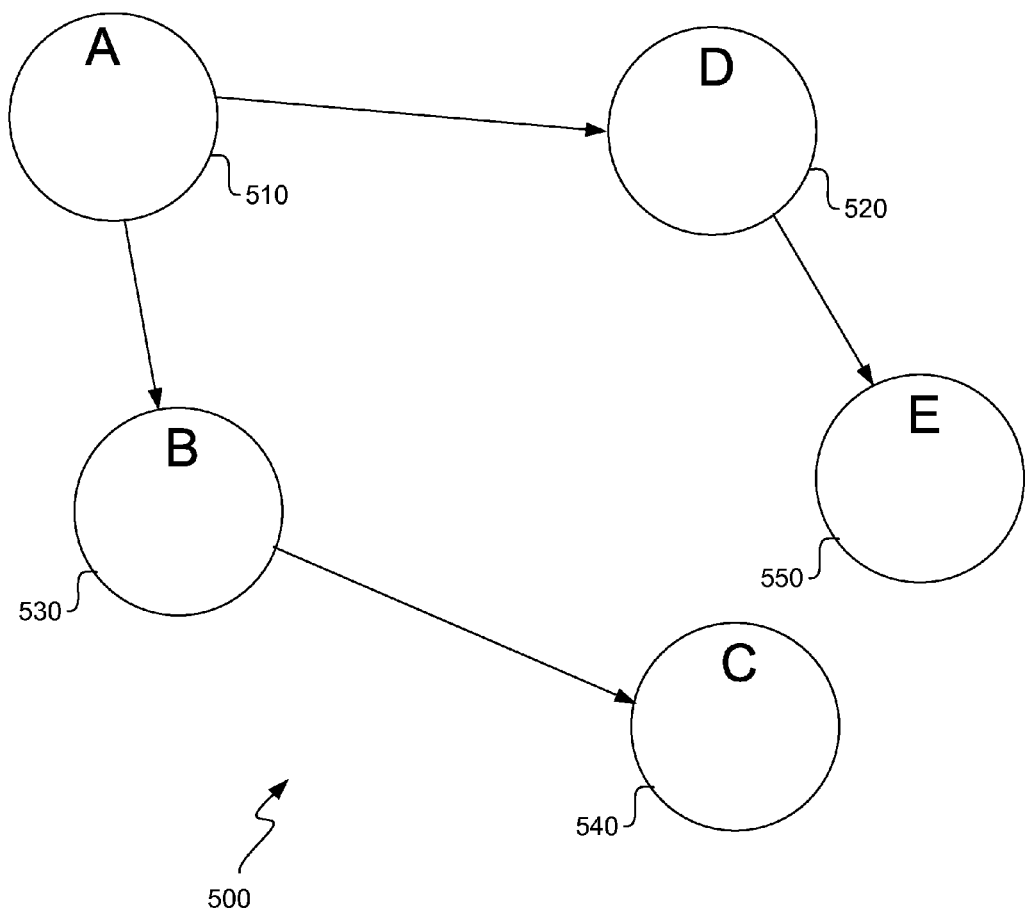
FIG. 5 illustrates a simple example of a method call graph.

FIG. 5 illustrates a simple example of a method call graph 500. This graph includes nodes A, B, C, D, and E, labeled 510-550. Basically, the graph is a linked set of nodes describing which methods call other methods within the overall method of the application. For example, graph 500 illustrates that method A calls method D, which in turn calls method E.

Similarly, method A calls method B, which in turn calls method C. In this example, node A is the parent of node D, and node C is the child of node B, etc. Thus, each node includes a set of its parents and a set of its children. Of course, representing which methods call which methods within a particular application may be implemented using a variety of data structures, and not necessarily using a graph representation.

For example, a linked list data structure may be used to represent method calls within an application, a relational database may be used, etc. In one particular embodiment, a class is defined named "GraphNode" which is used to describe each node in the method call graph. The variables used to identify such a node may be defined as follows:
  public Method method;
  public String signature;
  public int accessFlag=0.

Each node will record its parent set and its children set. For example, node E has a parent set which is {D}, and node B has a children set which is {C}. These sets may be defined as follows:
  public         Set<GraphNode>parents=new HashSet<GraphNode>( );
  public         Set<GraphNode>children=new HashSet<GraphNode>( ).

Thus, the method call graph may be built with a set of nodes defined by "GraphNode," where each node records not only its own identification but also its own parent and children sets, for example, as follows:
  public         Set<GraphNode>graph=new HashSet<GraphNode>.

In this fashion, a representation of the methods of the original software application 30 is formed which describes how the methods call one another within the application. And, as explained above, this representation may take the form of a method call graph, or may use any other data structure to describe the relationship between the methods. Once the calling relationship of the methods of the application have been represented in some form, it is then possible to analyze which methods are used to get user information ("source" APIs), which methods are used to send user information (sink" APIs). For example, a method call chain A-D-E may be defined, and a method call chain A-B-C may also be defined.

Because the present invention is concerned with collection of private or sensitive user information on a computing device and the improper dissemination of that information, it is useful to enumerate the source APIs and the sink APIs use within the .Net framework. In one particular embodiment, APIs are enumerated that are used on computing devices that make use of a Microsoft operating system (assuming that software applications that make use of this operating system are targeted).

Figure 6:
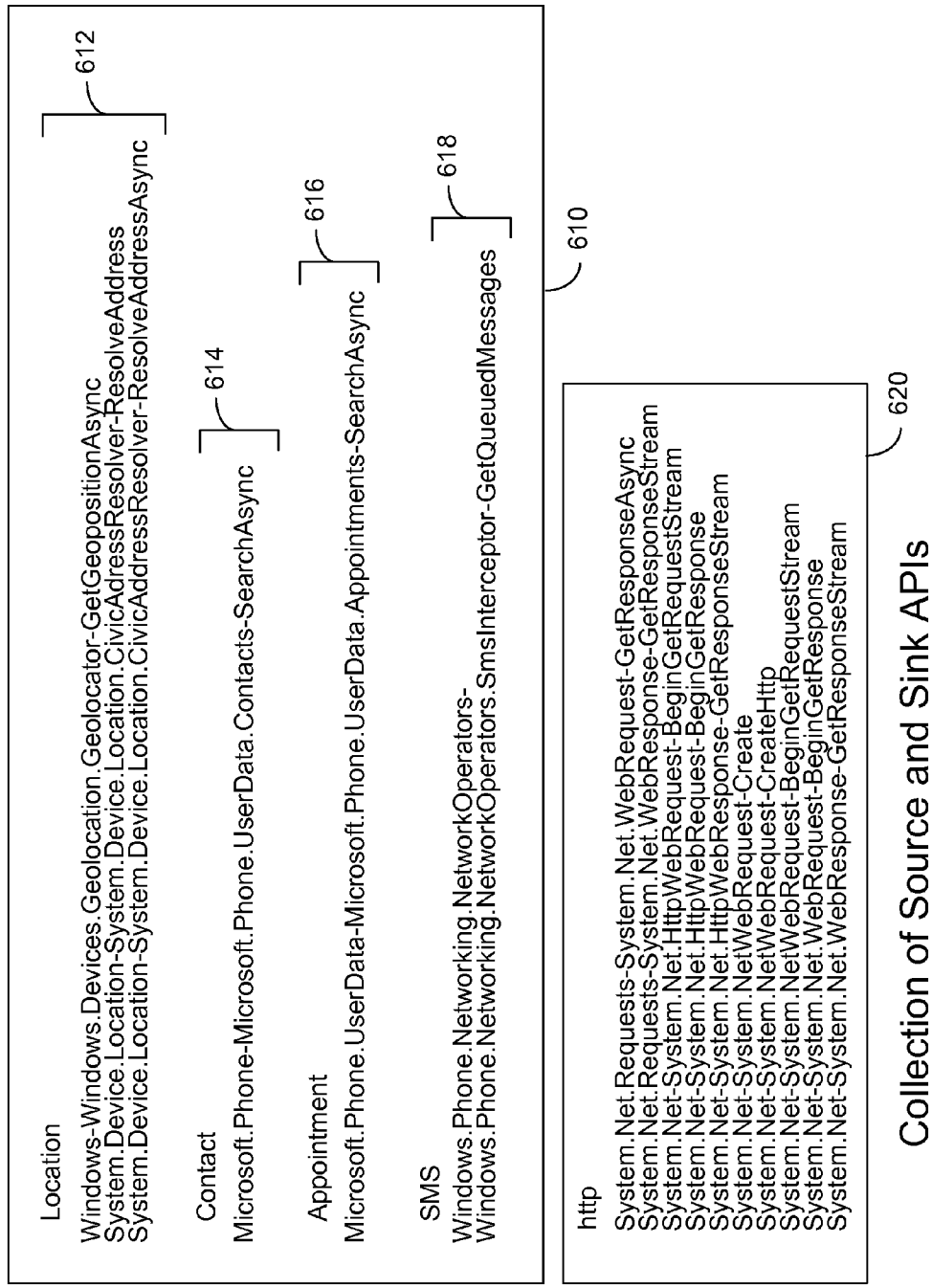
FIG. 6 illustrates a collection of source and sink APIs used within the .Net Framework on computing devices that use a Microsoft operating system.

Accordingly, FIG. 6 illustrates a collection of source and sink APIs used within the .Net Framework on computing devices that use a Microsoft operating system. As shown, a plurality of source APIs are shown in region 610 while a plurality of sink APIs are shown in region 620. In one embodiment, these APIs have been formatted according to the formatting used in FIG. 4 so that these APIs may be more easily compared to the methods used in the disassembled code of FIG. 4.

These APIs may be further organized as follows. Within region 610 there are a number of APIs 612 relating to determining the location of the computing device, an API 614 relating to determining contact information on the computing device, an API 616 relating to determining appointment information, and an API 618 relating to finding SMS information on the computing device. Similarly, region 620 shows a number of APIs used to send information from the computing device using the HTTP protocol. Of course, depending upon the particular computing device and the operating system that it implements, many other types of source APIs and sink APIs may be identified. Identification of various source and sink APIs that may be in use upon a particular computing device and within an application will be useful to determine which APIs have been used within software application 30, and to determine if these APIs are present within the method call graph built in step 220.

The source and sink API list depends on the Microsoft development SDK (for example). If Microsoft publishes or updates the SDK, the list will be changed, adding new APIs or removing old APIs. Thus, in this embodiment, FIG. 6 represents all of APIs which might be found based on the current Microsoft development SDK that is used.

Next, in step 224 two kinds of method call chains are collected using the method call graph. Using the example of FIG. 5, a depth first search may be used to traverse the method call graph in a reverse fashion in order to determine a method call chains. For example, one such call chain may be E-D-A, and another method call chain may be C-B-A. Of course, other techniques may be used to traverse a method call graph (or to traverse whichever data representation is being used).

And, it is not strictly necessary that the method call graph be traversed in reverse fashion. For example, a forward search may be used resulting in call chains A-D-E and A-B-C. Assuming that a reverse traversal is used, the leaf nodes of the method call graph (for example, nodes C and E) are searched to determine whether or not any of these leaf nodes represent one of the source or sink APIs of FIG. 6. If so, this means that a method call chain exists where the ultimate goal of the method call chain appears to be either collecting user information from the computing device or sending user information from the computing device.

Two types of method call chains are collected. Step 228 collects so-called "source" methods. These are methods which retrieve privacy information from the computing device including device information and user information. For example, device privacy information includes: the location of the device, applications executing or present on the device, the type of the device, or any unique identifiers associated with the device such as its MAC address. User privacy information includes: user names, passwords, account numbers, credit card information, contact lists, and e-mail addresses. In general, any private or sensitive information includes information that a reasonable user would not want to be divulged. The above privacy information may be stored anywhere within the computing device such as on a hard disk, in non-volatile memory, in memory, in a cache, etc. These source methods may be any suitable method that collects, retrieves or obtains this privacy information from its location within the computing device.

Step 232 collects so-called "sink" methods. These are methods which send the privacy information from the computing device to any location outside of the computing device. For example, one of these methods may attempt to take any of the above privacy information and transmit it over the Internet to a remote device, transmit it via an SMS message, transmit it via a wired or wireless connection, etc.

FIG. 7 illustrates examples of a source API method call chain 710 and a sink API method call chain 720 that have been determined from the method call graph. In this example, a source API and a sink API had been used as the traversal starting node in order to determine the source method call chain and the sink method call chain respectively. As shown, a method "PhoneAppTester" has called the source API "Contacts-SearchAsync," presumably to obtain contact information from the user's mobile telephone. In addition, the same method "PhoneAppTester" has called the sink API "BeginGetResponse" (via the method "AccessWebAsync"), presumably to send contact information from the user's mobile telephone.

Once the two (or more) method call chains have been determined, a comparison is performed in step 236 in order to determine whether at any point in these method call chains there is a method in common. In this simple example, it is apparent that both method call chains begin with same the method "PhoneAppTester." Using the example of FIG. 5, it will be apparent that the two method call chains C-B-A and E-D-A both have a method A in common. It is not strictly necessary that the method call chains have their first calling method in common. For example, it is entirely possible that within two lengthy method call chains that there is an intermediate node that is in common between the two call chains. Even though the first calling method of each call chain may not be in common, there still exists a single method which is invoking a source API and a sink API on the computing device, thus indicating that this method (and the overall application) is attempting to send private information from the user's device.

Figure 8:
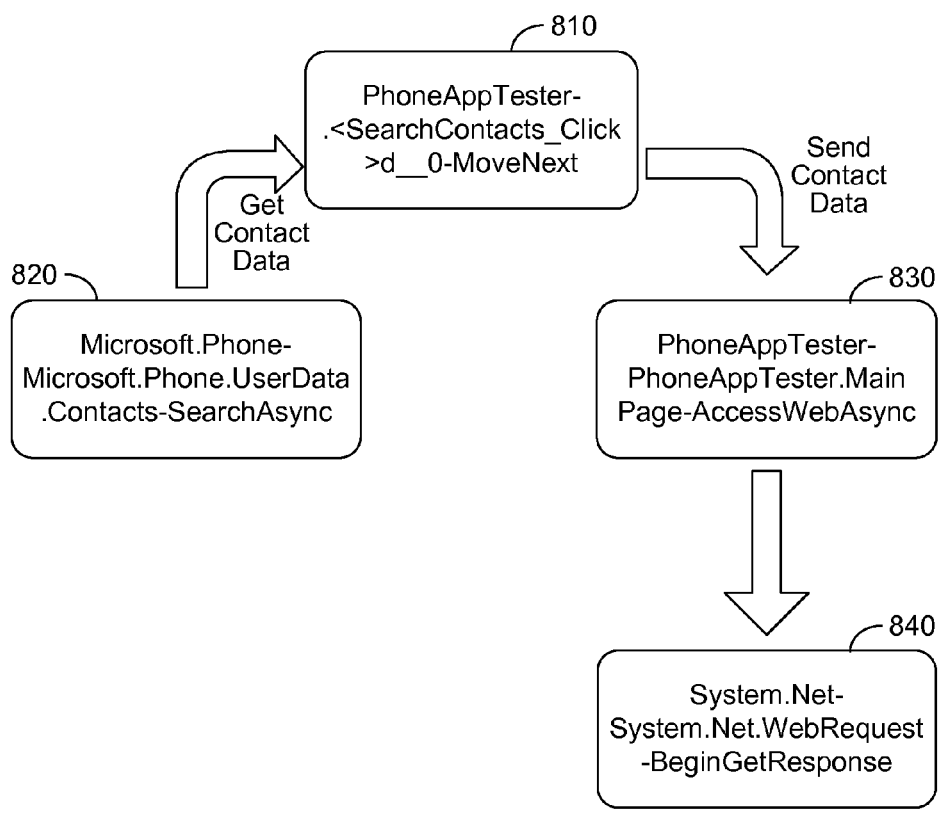
FIG. 8 illustrates graphically the intersection of two different method call chains.

FIG. 8 illustrates graphically the intersection of two different method call chains. This example shows how the method 810 not only gets user contact data from the computing device using API 820, but also how method 810 sends the contact data from the computing device using methods 830 and 840. Of course, these method call chains may be longer and more complex, and the intersection of these two call chains may not necessarily occur at the vertex, but at an intermediate point within the two call chains (or the intersection may occur between the first calling method of one of the call chains and at an intermediate node within the other call chain).

Accordingly, once it is determined in step 240 that there is a method (or node) in common between the two method call chains, then in step 248 a determination is made that a privacy leak exists in the application. If no node is found in common, then in step 244 a determination is made that no privacy leak exists. If a privacy leak exists, then further steps may be taken such as displaying a warning on the computing device, disabling the software application, sending a message or report to an e-mail address or other location, invoking antivirus software or other software to remedy the problem found within the application, etc.

Computer System Embodiment

Figure 9A:
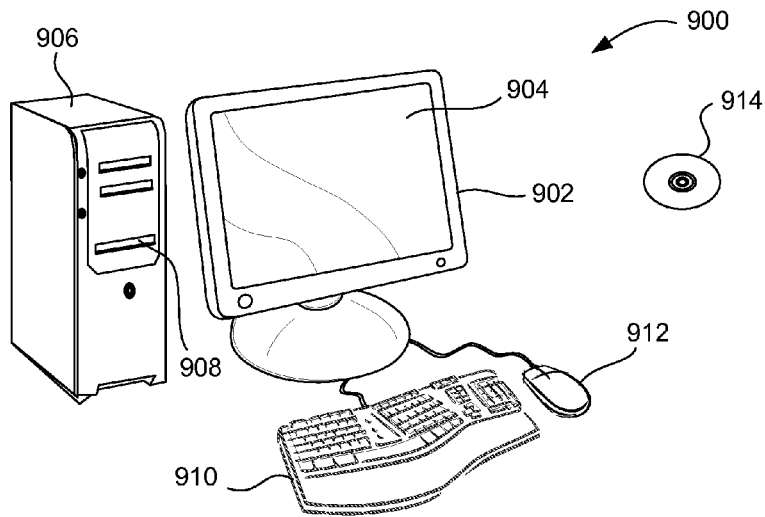
FIGS. 9A and 9B illustrate a computer system suitable for implementing embodiments of the present invention.
Figure 9B:
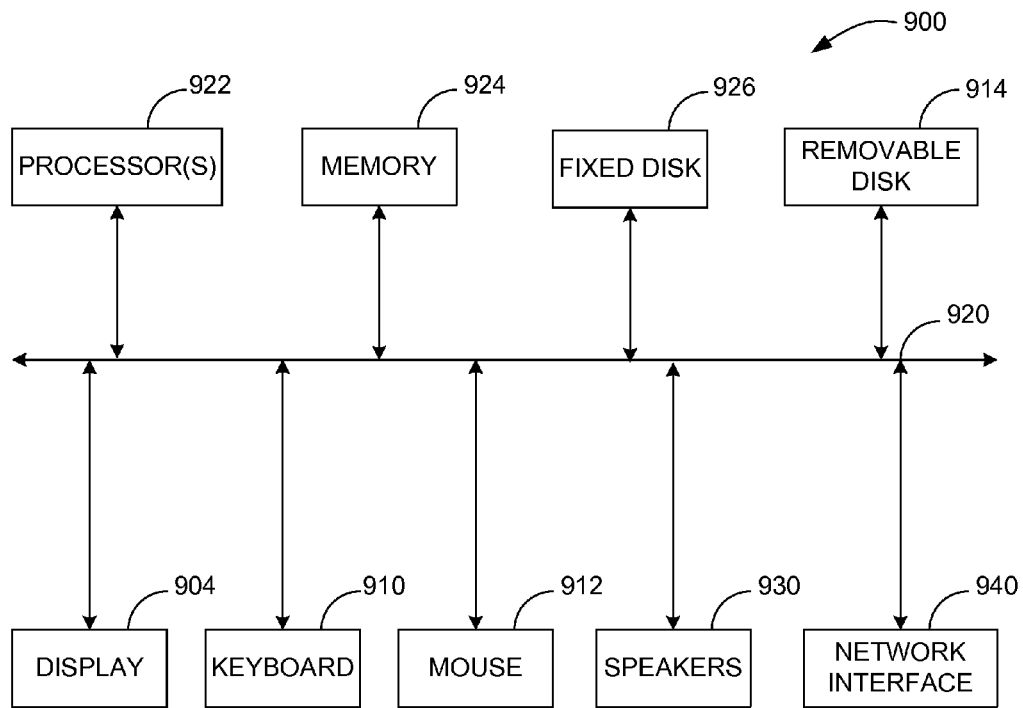

FIGS. 9A and 9B illustrate a computer system 900 suitable for implementing embodiments of the present invention. FIG. 9A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 9B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A computer implemented method of detecting a privacy leak in a .Net software application, said method comprising:
receiving a binary computer file suitable for execution within the .Net framework;
disassembling said binary computer file into a human-readable language, said language including a plurality of methods wherein each method includes at least one instruction;

using said language, constructing a representation of a relationship between said methods, said representation indicating which of said methods call others of said methods;

determining a source method call chain within said representation that includes a source API (application programming interface) function in a first one of said methods that retrieves information from the computing device, said source API function being in a source leaf node of said source method call chain;

determining a sink method call chain within said representation that includes a sink API function in a second one of said methods that sends information from said computing device, said sink API function being in a sink leaf node of said sink method call chain; and generating an alert only when it is determined that a method exists in common between said source method call chain having said source API function in said source leaf node and said sink method call chain having said sink API function in said sink leaf node.

2. The method as recited in claim 1 further comprising:
downloading said binary computer file from a remote computer server over the Internet to said computing device; and performing said steps of claim 1 on said computing device.

3. The method as recited in claim 1 further comprising:
constructing said representation using an abstract syntax tree that represents said binary computer file.

4. The method as recited in claim 1 wherein said representation is implemented in a data structure as a graph.

5. The method as recited in claim 1 wherein said method in common is a first node of each of said method call chains.

6. The method as recited in claim 1 wherein said method in common is an intermediate node of one of said method call chains.

7. A computer implemented method of detecting a privacy leak in a .Net software application, said method comprising:

receiving a binary computer file suitable for execution within the .Net framework;

disassembling said binary computer file into Common Intermediate Language (CIL) code, said CIL code including a plurality of methods wherein each method includes at least one instruction;

using said CIL code, constructing a representation of a relationship between said methods, said representation indicating which of said methods call others of said methods;

determining a source method call chain within said representation that includes a source API (application programming interface) function in a first one of said methods that retrieves information from a computing device, said source API function being in a source leaf node of said source method call chain;

determining a sink method call chain within said representation that includes a sink API function in a second one of said methods that sends information from said computing device, said sink API function being in a sink leaf node of said sink method call chain; and generating a message indicating there is no privacy leak when it is determined that no method exists in common between said source method call chain having said source API function in said source leaf node and said sink method call chain having said sink API function in said sink leaf node.

8. The method as recited in claim 7 further comprising:
downloading said binary computer file from a remote computer server over the Internet to said computing device; and performing said steps of claim 7 on said computing device.

9. The method as recited in claim 7 further comprising:
constructing said representation using an abstract syntax tree that represents said binary computer file.

10. The method as recited in claim 7 wherein said representation is implemented in a data structure as a graph.

11. The method as recited in claim 7 wherein said method in common is a first node of each of said method call chains.

12. A computer implemented method of detecting a privacy leak in a .Net software application, said method comprising:

receiving said .Net software application suitable for execution within the .Net framework, said .Net software application being in Common Intermediate Language (CIL) code, said CIL code including a plurality of methods wherein each method includes at least one instruction;

formatting method names of said methods into a first format;

constructing a data structure representing a relationship between said methods, said data structure indicating which of said methods call others of said methods;

formatting a plurality of API (application programming interface) function names that potentially may be called by said .Net software application into said first format;

determining a source method call chain within said data structure that includes a first one of said API function names in a first one of said methods, said first API function name arranged to source information from the computing device; said first API function being in a source leaf node of said source method call chain;

determining a sink method call chain within said data structure that includes a second one of said API function names in a second one of said methods, said second API function name arranged to sink information from said computing device, said second API function being in a sink leaf node of said sink method call chain; and generating an only alert when it is determined that a method exists in common between said source method call chain having said first API function in said source leaf node and said sink method call chain having said second API function in said sink leaf node.

13. The method as recited in claim 12 further comprising:
downloading said .Net software application from a remote computer server over the Internet to said computing device; and performing said steps of claim 1 on said computing device.

14. The method as recited in claim 12 further comprising:
matching said first API function name with a method of said source method call chain; and matching said second API function name with a method of said sink method call chain.

15. The method as recited in claim 12 wherein said data structure represents a graph.

16. The method as recited in claim 12 wherein said method in common is an initial calling node of each of said method call chains.

* * * * *